(12) United States Patent
Gkinosatis

(10) Patent No.: US 12,296,562 B2
(45) Date of Patent: May 13, 2025

(54) OVEN SKIN PACKAGING FILM

(71) Applicant: Flexopack S.A, Koropi (GR)

(72) Inventor: Dimitris Gkinosatis, Koropi (GR)

(73) Assignee: Flexopack S.A, Koropi (GR)

( * ) Notice: Subject to any disclaimer, the term of this patent is extended or adjusted under 35 U.S.C. 154(b) by 54 days.

(21) Appl. No.: 17/160,503

(22) Filed: Jan. 28, 2021

(65) Prior Publication Data

US 2021/0229406 A1   Jul. 29, 2021

(30) Foreign Application Priority Data

Jan. 28, 2020   (EP) .................................... 20154102

(51) Int. Cl.
| | |
|---|---|
| B32B 27/08 | (2006.01) |
| B29C 48/10 | (2019.01) |
| B32B 7/02 | (2019.01) |
| B32B 27/10 | (2006.01) |
| B32B 27/16 | (2006.01) |
| B32B 27/30 | (2006.01) |
| B32B 27/32 | (2006.01) |
| B32B 27/36 | (2006.01) |
| B65D 81/20 | (2006.01) |
| B65D 81/34 | (2006.01) |
| C08J 5/18 | (2006.01) |

(52) U.S. Cl.
CPC ............ *B32B 27/08* (2013.01); *B32B 27/306* (2013.01); *B32B 27/32* (2013.01); *B32B 27/36* (2013.01); *B65D 81/2023* (2013.01); *B65D 81/343* (2013.01); *C08J 5/18* (2013.01); *B29C 48/10* (2019.02); *B32B 7/02* (2013.01); *B32B 27/10* (2013.01); *B32B 27/16* (2013.01); *B32B 2250/02* (2013.01); *B32B 2250/05* (2013.01); *B32B 2250/24* (2013.01); *B32B 2305/72* (2013.01); *B32B 2307/306* (2013.01); *B32B 2307/50* (2013.01); *B32B 2307/7244* (2013.01); *B32B 2439/70* (2013.01); *C08J 2333/04* (2013.01); *C08J 2367/03* (2013.01); *Y10T 428/31797* (2015.04); *Y10T 428/31895* (2015.04); *Y10T 428/31906* (2015.04); *Y10T 428/31935* (2015.04)

(58) Field of Classification Search
None
See application file for complete search history.

(56) References Cited

U.S. PATENT DOCUMENTS

| | | | |
|---|---|---|---|
| 3,574,642 A | 4/1971 | DelDuca | |
| 3,681,092 A | 8/1972 | Titchenal et al. | |
| 3,713,849 A | 1/1973 | Grindrod et al. | |
| 3,832,821 A * | 9/1974 | Walus | B65B 11/52 53/140 |
| 4,055,672 A | 10/1977 | Hirsch et al. | |
| RE30,009 E | 5/1979 | Perdue et al. | |
| 4,226,905 A * | 10/1980 | Harbourne | B29C 48/022 264/564 |
| 4,240,993 A * | 12/1980 | Sun | B32B 37/203 264/471 |
| 4,287,151 A * | 9/1981 | Esakov | B29C 48/10 425/72.1 |
| 4,387,126 A * | 6/1983 | Rebholz | B32B 15/08 383/113 |
| 5,346,735 A | 9/1994 | Logan et al. | |
| 5,614,228 A * | 3/1997 | Demerest | B29C 51/002 425/384 |
| 6,592,975 B1 * | 7/2003 | Ueyama | B32B 27/32 428/913 |
| 10,639,873 B1 * | 5/2020 | Murga | B32B 27/20 |
| 2002/0012807 A1 * | 1/2002 | Kurian | B32B 27/36 264/211.13 |
| 2010/0221391 A1 * | 9/2010 | Deng | C08J 7/043 220/573.1 |
| 2011/0011854 A1 * | 1/2011 | Middleton | H05B 6/6491 219/759 |
| 2012/0141640 A1 * | 6/2012 | Anderson | B65D 31/02 426/394 |
| 2013/0193135 A1 * | 8/2013 | Middleton | H05B 6/6491 219/730 |
| 2014/0216975 A1 * | 8/2014 | Chrysanthidis | B65D 79/00 206/524.6 |
| 2014/0234493 A1 * | 8/2014 | Forloni | C09J 7/35 426/113 |
| 2016/0272389 A1 * | 9/2016 | Wang | B32B 27/306 |
| 2017/0136747 A1 * | 5/2017 | Torradas | B32B 27/286 |
| 2018/0362232 A1 | 12/2018 | Spigaroli et al. | |
| 2019/0030857 A1 | 1/2019 | Fanfani et al. | |
| 2019/0389188 A1 * | 12/2019 | Forloni | C08K 5/54 |
| 2020/0180281 A1 * | 6/2020 | Ciocca | B32B 27/308 |

(Continued)

FOREIGN PATENT DOCUMENTS

| | | |
|---|---|---|
| EP | 243510 A1 | 11/1987 |
| EP | 1398149 A1 | 3/2004 |

(Continued)

OTHER PUBLICATIONS

Search Report for Great Britain patent application No. 2100891.7, dated Jun. 1, 2021, two pages.
Corrected Search Report for Great Britain patent application No. 2100891.7, dated Jun. 1, 2021, two pages.
Examination Report for Great Britain patent application No. 2100891.7, dated Jun. 2, 2021, two pages.
European Search Report for European patent application No. EP 21153439, dated Jun. 4, 2021, three pages.
Search Opinion for European patent application No. 21153439.1, three pages, (June 2021).

*Primary Examiner* — Vivian Chen
(74) *Attorney, Agent, or Firm* — Harness, Dickey & Pierce, P.L.C.

(57) ABSTRACT

A vacuum skin packaging film produced by the hot blown film method and comprising a polyester having a melting point of more than 200C.

5 Claims, No Drawings

(56) References Cited

U.S. PATENT DOCUMENTS

| | | | | |
|---|---|---|---|---|
| 2020/0189254 A1* | 6/2020 | Liperoti | ................ | B29C 65/242 |
| 2021/0347936 A1* | 11/2021 | Dewael | ................... | C08L 67/04 |

FOREIGN PATENT DOCUMENTS

| | | | |
|---|---|---|---|
| EP | 1555657 A1 | 7/2005 | |
| EP | 1398149 B1 | 5/2007 | |
| EP | 2459448 B1 | 1/2015 | |
| EP | 2722279 B1 | 8/2017 | |
| FR | 1258357 A | 4/1961 | |
| FR | 1286018 A | 3/1962 | |
| JP | H09183200 A | 7/1997 | |
| JP | 2000302892 A | 10/2000 | |
| KR | 20140100365 A | 8/2014 | |
| WO | WO-2009141214 A1 | 11/2009 | |
| WO | 2011/012652 A1 | 2/2011 | |
| WO | WO 2012/160142 A1 * | 11/2012 | |
| WO | 2014/060507 A1 | 4/2014 | |
| WO | WO-2019/002105 A1 | 1/2019 | |

\* cited by examiner

OVEN SKIN PACKAGING FILM

CROSS-REFERENCE TO RELATED APPLICATIONS

This application claims priority to European Patent Application No. EP20154102.6, filed Jan. 28, 2020. The entire disclosure of the above application is incorporated herein by reference.

FIELD

The invention relates to a vacuum skin food package for use in conventional oven and more particularly to a food package able to withstand conditions up to 220C comprising a thermoplastic lid film which comprises polyester.

BACKGROUND

This section provides background information related to the present disclosure which is not necessarily prior art.

SUMMARY

This section provides a general summary of the disclosure, and is not a comprehensive disclosure of its full scope or all of its features.

BACKGROUND

Plastic containers have been increasingly used in packaging applications, such as "food packaging", and in particular for cook-in convenience foods. As an example, ready-prepared ovenable meals which can be warmed in a conventional oven. Today, busy customers are demanding higher quality products, easier-to-use packaging and faster reheating options to achieve more flexibility in the kitchen. The ability to cook food in the conventional oven is a practical necessity.

Vacuum skin packaging is a known packaging process in which after food is placed in a container (often a tray), air is drawn from the package prior to sealing it close. Such packaging has comparable storage and preservation characteristics to shrinkable packaging and usually is more eye appealing.

The vacuum skin packaging in general involves two packaging containers:
1. The top lid film which conform onto the product
2. The bottom thermoformable film which is formed into a tray during the first step of the packing process and where-into the food is placed prior to the vacuum step. Often, a ready made tray is used instead of a bottom thermoformable film.

Cook-in packaging is packaging in which a food product is packed non-cooked or precooked to the consumer. The consumer then warms or cooks the food without removing the package.

The cook-in concept is particularly desired since it avoids the need for the consumer to handle raw meat or fish, which is often disagreeable. Moreover, the handling of raw meat is a growing concern from a food safety perspective while a pre-packed cook in food package reduces the risk of contamination.

In case the cook-in is done in a conventional oven, the films or trays used must combine the following features
1. Enough thermal resistance not to disintegrate in the oven for a cooking process of 220C lasting 1 hour.
2. The sealing of the top lid film to the tray or bottom thermoformable film must be strong enough to avoid any leakers or unsealed areas which could be dangerous for the food integrity.
3. The oxygen barrier of both top and bottom (or tray) materials are high enough to protect the film from oxygen ingress which is detrimental for the shelf life of the product.

Experience has shown that for the bottom thermoformable film/tray the options are
1. Polyester sheet or ready made tray
2. Plain aluminium tray
3. Coated aluminium tray.

Polypropylene based sheet or tray could be also used but only in relatively mild oven conditions.

In the art a lot of different ovenable films have been proposed and used for cook-in processes.

Application US2010/0221391 describes an ovenable vacuum skin packaging process where the top film used is comprised of polyester. The film is oriented, preferably biaxially oriented. It is our experience that this material-process combination is not able to create vacuum skin packages with big cavities as is often the case in the art.

Application EP243510 describes a film for vacuum skin packaging comprising ethylene vinyl acetate copolymer. Potential use in ovenable process is not discussed.

Application WO2019/002105 describes a polyester vacuum skin packaging film. This film is produced by biaxial orientation such as tenter frame process. This process is quite complicated and expensive.

Also the formability (ability to produce a vacuum skin packaging pack) is reduced as the film is oriented.

As a latest trend in the market, a film is bonded to coated or uncoated paper sheet passing through a "thermal lamination" section. Then the paper sheet (having the plastic film as sealing layer) is sealed inline to a lidding film. The paper-plastic adhesion of the bottom web is often desired to be in such a level so that the consumer may manually separate paper from plastic and dispose it in the suitable waste bin. Machines that offer this concept are offered by companies such as Mondini, Sealpac or Multivac.

SUMMARY

The present invention describes an ovenable vacuum skin film comprises a sealing layer comprising polyester. The polyester preferably has a melting point of at least 200C and a glass transition temperature of at least 60C measured as per ASTM D3418.

Definitions

In this application the following definitions are used:

The term "vacuum skin packaging" is interpreted as well known in the art. That is, a process where a top lid film is drawn so that it conforms to the product to be packed and seals at a bottom film or tray.

Vacuum skin packaging is described in many references such as FR1258357, FR1286018, AU3491504, USRE30009, U.S. Pat. Nos. 3,574,642, 3,681,092, 3,713, 849, 4,055,672, 5,346,735, WO2009141214, EP2722279 and EP2459448.

The term "film" refers to a flat or tubular flexible structure of thermoplastic material.

As used herein the term "top lidding film" refers to the film which conforms to the product during the vacuum skin packaging process. It is also called "top film".

The term "heat shrinkable" refers to a film that shrinks at least 10% in at least one of the longitudinal and transverse directions when heated at 90° C. for 4 seconds. The shrinkability is measured according to ASTM 2732.

The phrase "longitudinal direction" or "machine direction" herein abbreviated "MD" refers to a direction along the length of the film.

The phrase "outer layer" refers to the film layer which comes in immediate contact with the outside environment (atmosphere).

The phrase "inner layer" refers to the film layer that comes in direct contact with the product packed. This is also called "sealing layer" as this layer must be hermetically sealed in order to protect the product from ingress of air.

The phrase "intermediate layer" refers to any layer of the film that is neither outer nor inner layer. A film may comprise more than one intermediate layers.

As used herein, the term "homopolymer" refers to a polymer resulting from polymerization of a single monomer.

As used herein, the term "copolymer" refers to a polymer resulting from polymerization of at least two different monomers.

As used herein, the term "polymer" includes both above types.

As used herein the term "polyethylene" identifies polymers consisting essentially of the ethylene repeating unit. The ones that have a density more than 0.940 are called high density polyethylene (HDPE), the ones that are have less than 0.940 are low density polyethylene (LDPE).

As used herein the phrase "ethylene alpha olefin copolymer" refers to polymers like linear low density polyethylene (LLDPE), medium density polyethylene (MDPE), very low density polyethylene (VLDPE), ultra low density polyethylene (ULDPE), metallocene catalyzed polymers and polyethylene plastomers and elastomers. In the art, it is often considered that LLDPE has a density of roughly 0.917-0,930, a medium density polyethylene of 0.930-0.945, a very low density polyethylene 0.905-0.917 and an ultra low density polyethylene of lower than 0.905.

In these cases the alpha olefin can be propene, butene, hexene, octene etc. as known in the art.

As used herein the term "homogeneous ethylene alpha olefin copolymers" refer to ethylene alpha olefin copolymers having a molecular weight distribution less than 2.7 as measured by gel permeation chromatography (GPC). Typical examples of these polymers are AFFINITY™ from DOW™ or Exact from Exxon.

As used herein the phrase "styrene polymers" refers to styrene homopolymer such as polystyrene and to styrene copolymers such as styrene-butadiene copolymers, styrene-butadiene-styrene copolymers, styrene-isoprene-styrene copolymers, styrene-ethylene-butadiene-styrene copolymers, ethylene-styrene copolymers and the like.

As used herein the phrase "ethylene methacrylate copolymers" refers to copolymers of ethylene and methacrylate monomer. The monomer content is less than 40%. Abbreviation used is EMA.

As used herein the phrase "ethylene vinyl acetate copolymer" refers to copolymers of ethylene and vinyl acetate. Abbreviation used is EVA.

As used the term "crosslinked EVA" refers to copolymers of ethylene and vinyl acetate which have created crosslink structure. This is achieved often by radiation or by using peroxides. The crosslinking is usually done during extrusion of the film or at a later stage.

As used herein, the term EVOH refers to saponified products of ethylene vinyl ester copolymers. The ethylene content is typically in the range of 25 mol % to 50 mol %.

As used herein the term PVDC refers to a vinylidene chloride copolymer wherein a major amount of the copolymer comprises vinylidene chloride and a minor amount of the copolymer comprises one or more monomers such as vinyl chloride and/or alkyl acrylates and methacrylates.

As used herein the term polyamide refers to homopolymers and copolymers.

As used herein the term "ionomer" refers to ethylene-acid copolymers which have been neutralized by metals such as sodium, zinc, lithium or others.

The acid used is usually methacrylic or acrylic acid.

As used herein, the term "ethylene acid copolymer" refers to copolymers of ethylene with acid, most usually methacrylic or acrylic acid.

As used herein, the term "polyester" refers in general to homopolymers or copolymers that have an ester linkage between monomer units. The term includes crystalline polymers, amorphous polymers and polyester elastomers. Common polyesters are crystalline PET (polyethylene terephthalate), amorphous PET, PETG (glycol modified polyethylene terephthalate), PBT (polybutylene terephthalate), PTT (polytrimethylene terephthalate), PBN (polybutylene naphthalate), PEN (polyethylene naphthalate), polyester-ether block copolymers and polyester-ester block copolymers of hard and soft blocks.

The ester monomer unit may be represented by the general chemical formula R—C(O)O—R' where each one of R and R' is an alkyl group and may be generally formed from the polymerization of dicarboxylic acid and diol monomers or monomers containing both carboxylic acid and hydroxyl moieties.

As used herein the term "polybutylene" refers to butene-1 homopolymers and copolymers. Useful copolymers comprise ethylene mer units. Ethylene content should be generally less than 50%.

As used herein, the term "oriented" refers to a thermoplastic web, which has been elongated, at a temperature above the softening temperature, in either one direction ("uniaxial") or two directions ("biaxial"), followed by cooling the film to "set" it while substantially retaining the elongated dimensions. As used herein, the term "oriented" or "biaxially oriented" or "stretched" refers to orientation from the solid state. On the contrary, any reference to "hot blown film" means orientation from the melt state, as well known in the art.

In the present invention, both the melting point and the glass transition temperature of the polyester material are measured as per ASTM D3418 as well known in the art.

DETAILED DESCRIPTION

The present invention describes a crosslinked film comprising a sealing layer comprising polyester.

In a preferable embodiment, the polyester has a melting point of higher than 200C, more preferably higher than 220C.

In a preferable embodiment, the polyester has a glass transition temperature of at least 60C.

In a further preferable embodiment, the polyester has an intrinsic viscosity (IV) at least 0.65, as measured by ASTM D5225.

In a further preferable embodiment, the film is electron beam radiated with a dose of more than 4 megarads . . .

In a further preferable embodiment, the film comprises an outer layer comprising EVA and or EMA . . .

In a further preferable embodiment, the film is produced by the hot blown film process and is not stretched.

In a further preferred embodiment, the film is thermally laminated to paper and the polyester sealing later is sealed to a top lidding film that can also withstand ovenable conditions.

Film Construction

Preferably the film comprises 5 to 15 layers, more preferably 7 to 12 layers.

A typical example of the film construction in 7 layer mode is

Outer layer/intermediate layer/tie layer/barrier layer/tie layer/intermediate layer/inner layer The film is preferably produced by the hot blown film method and is not heat shrinkable.

Barrier Layer(s)

The film in a preferable embodiment contains high oxygen barrier materials so that it protects the components of the pack from the detrimental effect of oxygen ingress. EVOH is a preferred option but also polyamide and PVDC are viable alternatives. The EVOH preferably comprises 24% mol to 50% mol ethylene, more preferably 27% mol to 48% mol.

Intermediate Layer(s)

Preferably, the intermediate layers comprise EVA. The EVA can be alone in this layer or in a form of blend or compound. Suitable blending partners for the EVA include EMA, ethylene alpha olefin copolymers, styrene polymers, LDPE and others.

The vinyl acetate content of the EVA used in the intermediate layers is 3% to 90% by weight, preferably 5% to 80% by weight. Preferred melt flow indexes are 0.3 to 5 measured at 190C, 2.16 kilos.

In a further preferred version, the film comprises at least 30% by weight ethylene alpha olefin copolymers with density less than 0.920 g/cm$^3$.

Tie Layer(s)

As well known in the art, there is no natural adhesion between polyolefins such as EVA and high barrier polymers such as EVOH. Therefore, suitable adhesive resins must be used so that the film does not collapse under the oven heating.

Suitable materials for the tie layer process include maleic anhydride modified EVA, maleic anhydride modified polyethylene, maleic anhydride modified EMA, maleic anhydride modified elastomer, partially saponified EVA copolymer and polyurethane elastomer.

Outer Layer

The outer layer of the film comprises preferably EVA and/or EMA.

Preferably the melting point of the EVA and/or EMA is less than 100C.

If the melting point is more than 100C the bonding to the paper sheet may be compromised.

Sealing Layer

The sealing layer of the film comprises polyester which preferably has a melting point of higher than 200C, more preferably higher than 220C. In a preferable embodiment, the glass transition temperature of the polyester is at least 60C.

The sealing layer may comprise other polymers that are blendable to the polyester.

In general, the above layers may comprise further well known in the art additives such as antiblock, slip, antifog, polymer processing enhancers and others. Additives that would enhance the crosslinking are also inside the scope of the invention as long as they are approved for food contact.

In a preferred embodiment, the polyester containing sealing layer may comprise antifog additive.

As another preferred option, an antifog coating may be applied on the sealing layer Crosslinking The crosslinking may be done by various methods but the preferred are e-beam, gamma radiation and peroxides. The dose of the crosslinking is preferably more than 4 mrads, even more preferably more than 6 mrads, even more preferably more than 10 mrads.

Container

The film of the invention can be used both as vacuum skin packaging film for ovenable applications or as film bondable to paper and sealable to lidding film comprising polyester sealing layer.

In the case of vacuum skin packaging film:

The container can be a film or sheet thermoformed in line with the vacuum skin packaging process or a ready made tray.

In one preferable embodiment of the invention, the container is a tray or sheet with thickness at least 300 microns.

In a further preferable embodiment, this tray or sheet comprises polyester, preferably CPET.

In the case of a film bondable to paper, the film has a layer that can be thermally bonded to pare (such as EVA or EMA).

Mode of Production

The film is preferably produced by the hot blown film method as well known in the art.

The film is preferably not biaxially or monoaxially oriented (stretched).

Example 1

From a commercial hot blown film line we produced the following film

\*External layer, thickness 20 microns
\*Intermediate layer 1, thickness 10 microns
\*Tie layer 1, thickness 8 microns
\*EVOH, thickness 8 microns
\*Tie layer 2, thickness 8 microns
\*Intermediate layer 2, thickness 15 microns
\*Internal layer, thickness 21 microns.

The layers are as follows

External layer is 100% PET terephthalate-isophthalate copolymer with a melting point of 228C and glass transition temperature of 75C.

Intermediate layer 1 is anhydride modified ethylene alpha olefin copolymer, grade Admer™ 1955 from Mitsui.

Tie layer 1 and 2 are of a blend of 70% Attane™ SL4100 VLDPE from Dow Chemical and 30% Bynel® 41E710 (modified anhydride LLDPE) from Dow Chemical.

Intermediate layer 2 is an ethylene vinyl acetate copolymer having 18% by weight vinyl acetate and melt flow index 0.5 measured at 190C and 2.16 kilos as per ASTM 1238.

Internal layer comprises a medium density polyethylene, having a density of 0.934 and a melt flow index of 1 measured under 190C and 2.16 kilos according to ASTM D1238.

The EVOH layer comprised the grade Eval™ H171B which is a 38% mol ethylene grade.

The film was electron beam radiated with a dose of 12 Mrads.

Example 1 was a film to be used in a conventional vacuum skin packaging process, sealing to an APET or CPET tray.

The terms "external" and "internal" layer as used show the position of the layers in the hot blown film bubble. They are not to be confused to the terms "inner" and "outer" layer as defined.

Example 2

From a commercial hot blown film line we produced the following film
*External layer, thickness 20 microns
*Intermediate layer 1, thickness 10 microns
*Tie layer 1, thickness 8 microns
*EVOH, thickness 8 microns
*Tie layer 2, thickness 8 microns
*Intermediate layer 2, thickness 15 microns
*Internal layer, thickness 21 microns.
The layers are as follows
External layer is 100% PET terephthalate-isophthalate copolymer with a melting point of 228C and glass transition temperature of 75C.
Intermediate layer 1 is an hydride modified ethylene alpha olefin copolymer, grade Admer 1955 from Mitsui.
Tie layer 1 and 2 are of a blend of 70% Attane™ SL4100 VLDPE from Dow Chemical and 30% Bynel® 41E710 (modified anhydride LLDPE) from Dow Chemical.
The EVOH layer comprised the grade Eval™ H171B which is a 38% mol ethylene grade.
Intermediate layer 2 is an ethylene vinyl acetate copolymer having 18% by weight vinyl acetate and melt flow index 0.5 measured at 190C and 2.16 kilos as per ASTM 1238.
Internal layer is an ethylene vinyl acetate copolymer having 14% by weight vinyl acetate melt flow index 0.35 measured at 190C and 2.16 kilos as per ASTM D1238.
The film was electron beam radiated with a dose of 12 Mrads.
The film of example 2 was a film able to bond to a paper substrate and sealable to a polyester based lidding film as part of an ovenable application.

Comparative Example

The comparative example involved a film used in vacuum skin packaging applications.
The comparative film did not comprise polyester in the structure and had a thickness of 90 microns, same as the two films of Examples 1 and 2.
The comparative example is a well proven film in vacuum skin packaging applications and has excellent formability. However, it cannot withstand high temperatures as the ones developed during the oven cooking of the film.
Comparatively to this, it is generally known in the art that the use of polyester in vacuum skin packaging films creates problems related to formability and/or sealing. For this we refer to WO2019/002105 page 4, lines 9 to 20 which gives an idea of the formability issues presented by the current films used in the art.
Formability Test 1
The films of examples 1, 2 and the comparative example were tested as per formability during vacuum skin packaging process using an in house vacuum skin packaging tray sealer. The trays used were mono APET.
As a part of this test, 30 packs with fresh beef were made out of each of the films.
The number of blowouts (breakage of the packs due to inadequate melt strength of the material) was noted. This is a test often used to evaluate the suitability of the films as per the demanding vacuum skin packaging process.
The dome temperature (machine setting) was 200C.
The film of the example 1 had the polyester layer at the inside of the pack (sealing layer to the APET tray).
The film of the example 2 had the polyester layer at the outside of the pack (in contact to the machine dome).
Out of the 30 packs the film 1 of the invention had 3 blowouts.
Out of the 30 packs the film 2 had 4 blowouts.
Out of the 30 packs the comparative film had 4 blowouts.
Therefore, it seems that the films of the present invention have unexpectedly at least same formability compared to the commercial films already used in the vacuum skin packaging field
Peel Test
The packs were evaluated by their opening.
The packs made from the film of example 1 and the APET trays were found to be easily peelable at to the satisfaction of the panel.
The packs made from the film of example 2 and the APET trays were found to be too easily peelably to the APET. However, film 2 is targeted to adhere peelably to paper, seal to ovenable top lidding film and offer an ovenable environmentally friendly solution.
Adhere to Paper
Seal tests were arranged between the internal layer of example 2 (EVA layer) and coated paper.
The tests were done in the temperature range 110-130C, seal time 1-2 seconds using a lab Brugger heat sealing machine. This process simulates the bonding of paper to plastic film during inline thermal adhesion as made in commercial machines.
It was found that the film of the example 2 has a nice peel effect from the paper, thus allowing the easy separation between paper and plastic after the pack is thrown as waste.
Oven Evaluation
A coated paper piece 20×20 cm was fully covered by sealed stripes of film of example 2 as described above. Then a piece of meat was placed on the plastic layer and the pack was sealed at the edges using a top lidding film comprising polyester. In the state of the art, the oven resistant top lidding films are generally polyester based and the sealing layer comprises polyester.
The pack was put in an oven at 200C. After 30 minutes the seal between the film of example 2 and the top lidding film opened due to the hot air from the inside of the pack. This is a desirable effect to improve cooking quality.
10 minutes later the cooking process stopped and the meat cooking was evaluated.
There was not tearing or melting of the plastic, so the film can be used in ovenable applications.
The comparative example film having a polyolefin based sealing layer, is not able to heat seal to a top lidding film comprising polyester. The film of the present invention can be used in the oven application as it seals to polyester top lidding film.

What is claimed is:

1. A crosslinked plastic film bonded to paper, wherein the inner layer of the film consists of a polyester having a melting point more than 200° C. and glass transition temperature of at least 60° C., wherein the polyester is polyethylene terephthalate isophthalate copolymer, wherein the outer layer of the film which bonds to the paper comprises EVA (ethylene vinyl acetate copolymer) and/or EMA (ethylene methacrylate copolymer) and wherein the film is not oriented.

2. The film according to claim 1, wherein the film is produced by the hot blown film process.

3. The film according to claim 1, wherein the film comprises a further layer comprising an oxygen barrier material.

4. The film according to claim 1, wherein the film comprises ethylene alpha olefin copolymer.

5. The film according to claim 1, wherein the film comprises ethylene vinyl acetate.

\* \* \* \* \*